Patented Mar. 30, 1937

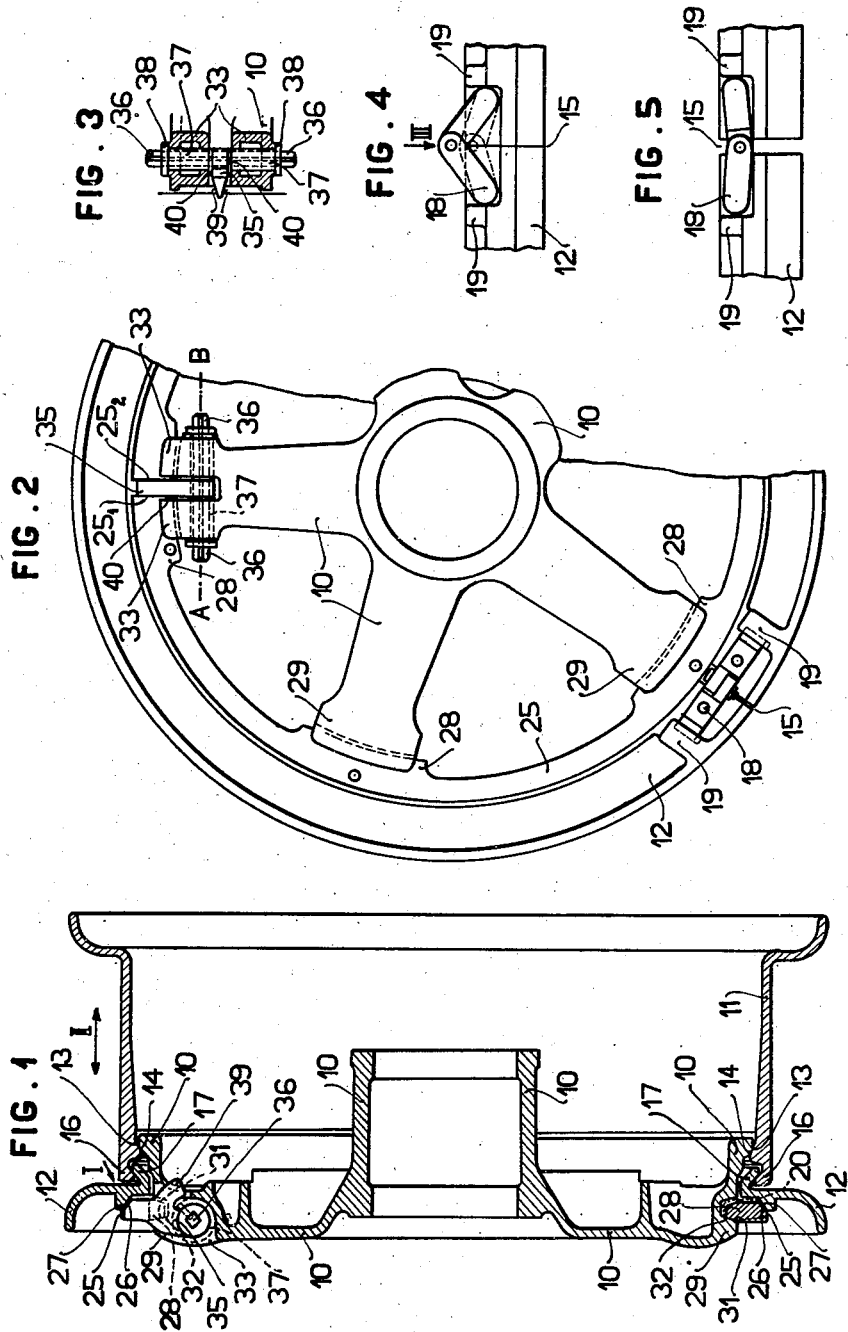
March 30, 1937. E. ZIPPER ET AL 2,075,155
VEHICLE WHEEL
Filed March 9, 1933
INVENTORS:
E. Zipper
W. Zipper
By Marks & Clark
Attys.

2,075,155

UNITED STATES PATENT OFFICE 2,075,155

VEHICLE WHEEL

Emil Zipper and Walter Zipper, Vienna, Austria

Application March 9, 1933, Serial No. 660,173
In Austria March 9, 1932

7 Claims. (Cl. 301—12)

This invention relates to vehicle wheels with a detachable felly-like rim of the type which is divided circumferentially, the sections thereof being adapted to be forced apart by the internal pressure of a pneumatic tire applied thereto, and thereby to be secured to the fixed rim or to the body of the wheel. In wheels of this type the sections constituting the detachable rim are loosely or disengageably interconnected, and one of the two sections bears against a counter-support which is detachably or adjustably connected to the body of the wheel. After the detachable rim, fitted with the fully inflated tire, has been applied to the wheel, the connection between the two sections is disengaged or released to such an extent that the internal pressure of the tire presses the sections apart and causes the same to become clamped between the above-mentioned fixed counter-support and the counter-support which is adjustably connected to the body of the wheel.

In order to permit of the fitting together of the parts of the wheel, and to allow for the unavoidable inaccuracies in construction, a clearance of a few millimeters must be provided between the adjustable counter-support and the rim section associated therewith when these parts are in their relative operative positions before the connections between the two sections is slackened off. After the slackening of this connection, the above-mentioned clearance is taken up by the displacement of the rim section effected by the internal pressure of the tire. This displacement is accompanied, when one of the two sections itself takes the form of an open expanding ring, by an alteration in the shape of this section, since the same is compressed to a smaller diameter by the internal pressure of the tire.

In the case of the hitherto known wheels of the described type, the displacement and/or deformation of the section bearing against the adjustable counter-support is so great that it is not possible to overcome the same, that is to say to restore this section to its original condition, in a sufficiently simple and effortless manner while the tire is still inflated. In order to take the detachable rim off the wheel it is thus necessary first to deflate the tire. This fact is of no consequence for the replacement of a punctured or otherwise damaged tire, but is a cause of very considerable inconvenience in the changing-over of tires which are not deflated, for example when putting the tires from the front wheels on to the rear wheels and vice versa, or when changing over the tires of twin wheels. In the case of these latter, the replacement of a damaged inner tire can only be effected after the outer tire has been deflated and removed.

The present invention has for its object to enable the displacement or deformation of the section bearing against the adjustable counter-support to be kept within such restricted limits that it can easily and effortlessly be overcome, and the section be restored to its original condition, with the tire remaining inflated, so that it becomes possible to detach and remount the rim with the tire in the inflated condition thereon. The problem thus presented is solved, in accordance with the present invention, by the arrangement that the adjustable counter-support associated with the body of the wheel is caused, during the process of being set to lock the detachable rim in position, to carry out an additional movement in the direction towards the detachable rim, while itself remaining in bearing contact with the body of the wheel. In this manner the above-mentioned clearance between the adjustable counter-support and the detachable rim is entirely or partly taken up, so that the displacement or deformation of the section supported or locked in position by the adjustable counter-support to be effected by the internal pressure of the tire, is reduced to a minimum.

A constructional example of the embodiment of the invention is shown in the accompanying drawing, in which:

Fig. 1 shows a wheel in accordance with the invention, in axial section.

Fig. 2 shows the same wheel in side elevation.

Fig. 3 is a section taken on the line A—B of Fig. 2.

Figs. 4 and 5 show details of the wheel.

Referring to the drawing, the body 10 of the wheel will be seen to be provided with a detachable rim which is divided circumferentially into two rim sections which are denoted by 11 and 12; in the example shown, this rim is constructed in accordance with the Austrian Patent No. 113,732. The one section 11 takes the form of a closed ring and bears with a conical seating surface 13 upon a conical seating surface 14 on the body 10 of the wheel (Fig. 1); while the other section 12 is transversely cut through at 15 (Fig. 2), so that its diameter can be slightly altered. The two sections 11 and 12 interengage with conical flanges 16 and 17 (Fig. 1). If the diameter of the section 12 be decreased, the conical flange 17 becomes slightly displaced on the flange 16 of the section 11 in the direction of the arrow I (Fig. 1), and the breadth of the rim thereby becomes somewhat greater. The enlargement of the diameter of the section 12 is effected by means of a toggle lever 18 the ends of which bear against lugs 19 on the mutually opposed ends of the section 12. When this toggle lever 18 is transferred from the buckled position shown in Fig. 4 into the stretched position shown in Fig. 5, the section 12 is firmly connected, with a somewhat enlarged diameter, to the section 11, and the tire previously applied to the rim can be fully inflated. In this condition, that is to say with expanded or spread section 12, the rim together with the fully inflated tire can be carried as a spare on an automobile or the like. In this condition also the rim is fitted on to the body 10 of the wheel, after which it is locked in position thereon, against the fixed counter-support 14 (Fig. 1) by means of a movable counter-support. If the toggle lever 18 be then released from its stretched position (Fig. 5) and lifted out, the internal pressure of the tire will force the sections 11, 12 apart, as indicated by the arrow II in Fig. 1. At the same time the diameter of the section 12 is slightly decreased, and the conical flange 17 caused to slide slightly upon the conical flange 16 in the direction of the arrow I (Fig. 1), without these flanges 16 and 17 being brought entirely out of engagement with each other. The sections 11 and 12 are then pressed by the internal pressure of the pneumatic tire with great force against the fixed counter-support 14 and against the adjustable counter-support then in the locking position, and in this manner the rim is made fast to the body of the wheel.

Between the detachable or adjustable counter-support for the detachable rim 11, 12 and the section 12 supported thereby there must necessarily be left, if only to allow for the unavoidable inaccuracies in manufacture, a certain clearance which is indicated by dotted lines in the lower part of Fig. 1 and denoted by 20. In order that the fitting together of the parts of the wheel may be capable of being carried out with sufficient ease this clearance must amount to several millimeters. If the detachable or adjustable counter-support take the form of a closed ring adapted to bear against the body 10 of the wheel, it will be clear that the displacement and deformation of the section 12 requiring to be effected by the internal pressure of the tire in order to cause this section to bear against the adjustable counter-support must correspond to this clearance 20, that is to say must be fairly great. If it is desired to detach the rim from the wheel while the tire remains inflated, it will be necessary to overcome the pressure of the section 12 against the ajustable counter-support, that is to say to reduce the breadth of the rim, which, in the case of the constructional example shown, implies enlargement of the diameter of the section 12. The comparatively great displacement and deformation of this section 12 effected by the internal pressure of the tire during the attachment of the rim must thus be made retrogressive, in opposition to the internal pressure of the tire and to the frictional resistance set up between the conical flanges 16 and 17. To this end the toggle lever 18 would have to be transferred from the markedly bent position shown in Fig. 4 into the fully stretched position shown in Fig. 5, which is, however, in practice quite impossible.

In accordance with the invention, the counter-support for the section 12 takes the form of an open expanding ring 25 which is provided on its outer periphery with a conical seating surface 26 for the correspondingly shaped seating surface 27 on the section 12, and which is capable of being expanded in any suitable manner, for example by means of a wedge-shaped member adapted to force its ends $25_1$ and $25_2$ (Figs. 2 and 3) apart. In the constructional example shown in the drawing, the expanding ring 25 is detachably connected to the body 10 of the wheel in the manner of a bayonet joint; for this purpose it is provided on its inner periphery with a number of inwardly extending lugs 28 which come into engagement with outwardly extending lugs 29 on the body 10 of the wheel. The ring 25 consists of steel and is elastic; in the non-tensioned condition its diameter is such that its seating surface 26 is spaced from the seating surface 27 on the section 12 to the extent of the required clearance 20 (see lower part of Fig. 1). In the non-tensioned state the expanding locking ring is thus loose and can be turned, so that its lugs 28 can be brought out of engagement with the lugs 29 on the body 10 of the wheel, and the ring can be removed.

In mounting a detachable rim of the type described on the body 10 of the wheel, the expanding locking ring 25 is first removed; the detachable rim with the inflated tire thereon, and with the section 12 set in the position of larger diameter, is then fitted on to the body 10 of the wheel, after which the expanding ring 25 is placed in position and turned into the locking position. Before the rigid connection between the sections 11 and 12 is released by withdrawal of the toggle lever 18, and the internal pressure of the tire thereby brought to bear in the above-described manner, the diameter of the locking ring 25 is increased by the spreading or forcing apart of its ends. In this manner the bearing surface 26 on the locking ring 25 is brought nearer to the bearing surface 27 on the section 12. If the ring 25 be then locked or otherwise set in the expanded condition, and the rigid connection between the sections 11 and 12 released by the withdrawal of the toggle lever 18 from the section 12, the extent to which the section is required to be displaced and deformed by the internal pressure of the tire is less by the amount to which the locking ring 25 has come nearer to this member in consequence of the described enlargement of its diameter. This extent is now but a fraction of the amount of movement necessary with a closed locking ring under th same circumstances. The slight amount of displacement and deformation of the section 12 which is now necessary can easily be made retrogressive with but little expenditure of energy, and that by means of the toggle lever 18. Since for the purpose of attaching the rim, the diameter of the section 12 is only decreased to quite a slight extent, the toggle lever 18, when inserted between the noses 19, will be almost in the fully stretched position, as indicated in dotted lines in Fig. 4. Pressure exerted upon the joint of this lever in the direction of the arrow III (Fig. 4) will thus be transmitted with very great leverage to the ends of the section 12.

Theoretically the diameter of the locking ring 25 could be increased to such an extent that its seating surface 26 is brought to bear against the seating surface 27 of the section 12 while the latter is set at its large diameter. In reality, however, there is a slight gap between these seating surfaces, since both the section 12 and also the locking ring 25 are not absolutely circular after having been spread or expanded in the described manner, and this slight gap only becomes closed by the pressing of the section 12 against the locking ring 25.

As Fig. 2 shows, the gap 15 in the section 12 is approximately diametrically opposite the gap in the expanding locking ring 25. The slight deviations from the circular produced in these parts by the spreading are approximately at right angles to each other, and they therefore cancel each other under the action of the internal pressure of the tire, so that when the rim is attached to the wheel the section 12 is perfectly circular.

The spreading locking ring 25 is further provided on its inner periphery with a conical surface 31 with which it bears in a radial sense against a correspondingly shaped conical surface 32 on the body 10 of the wheel. In the constructional example shown in the drawing the conical surfaces 31 and 32 are provided on the interengaging lugs 28 and 29 on the locking ring 25 and wheel 10, respectively. This arrangement ensures that the locking ring 25 remains coaxial to the wheel when spread from its ends in the described manner.

The spreading of the locking ring 25 can be effected in any suitable manner, for example by means of a toggle lever similar to that provided in conjunction with the section 12. In the constructional example shown in the drawing, the spreading of the locking ring 25 is effected by means of a wedge 35 which is pivotally mounted in a forked extension 33 on the body 10 of the wheel (Figs. 1 and 2). This wedge is fast on a square section pin 36 over which there is fitted a bushing 37 which is rotatably mounted in the body 10 of the wheel, and which is retained in position by means of two discs 38 which in their turn are retained by split pins. The projecting ends of the square section pin 36 serve for the application of a key or spanner by means of which the wedge 35 can be rocked. The wedge 35 itself is in the shape of an arc which is concentric to its axis of rotation, its wedge surfaces 39 being divergent in a peripheral direction relatively to the pivot axis. These wedge surfaces, as shown in Fig. 3, merge into parallel surfaces 40 which come into position between the ends 25₁ and 25₂ of the locking ring 25 (Figs. 1 and 2) when the wedge is in its end position. The internal pressure of the tire tends to compress the locking ring 25, and the portion of the wedge 35 having parallel faces is thus firmly clamped between the ends 25₁ and 25₂ of this ring.

To detach a rim with an inflated tire thereon, the ends of the section 12 are first spread slightly by means of the toggle lever 18. The toggle lever is thereby placed in its stretched position (Fig. 5), and caused to lock the section 12 in a condition of slight expansion. In this manner the pressure of the tire upon the locking ring 25 is relieved, so that the wedge 35 can be rocked outwards, and the locking ring then turned and removed. The rim together with the inflated tire can then be removed from the wheel, and is at once ready for mounting on the same wheel or on another wheel of the same construction.

Instead of a locking ring adapted to be attached to the wheel by a bayonet joint arrangement, a plain open expanding ring could also be employed. In this case, however, the ring would have to remain upon the body 10 of the wheel and, in order to permit of the removal of the rim from the wheel, would have to be capable of being compressed to such an extent that the removable section could be passed thereover. The locking ring would thus have to be capable of very considerable variation in diameter, and for this reason the employment of a bayonet ring of the type described is preferable.

Plain locking rings are already known per se in connection with wheels of this type. In the known wheels they serve, however, for the retention of undivided rims or of rims which are not clamped in position by the internal pressure of the tire. For this purpose the locking ring must be expanded to such an extent that it clamps the rim with sufficient force, which is, however, in practice quite impossible. In the present invention the expansibility of the locking ring 25 has for its purpose to bring its bearing surface nearer to the counter-moving bearing surface 27 on the section 12, so that the deformation and displacement of this section may be kept down to a minimum.

In the constructional example shown in the drawing the adjustable counter-support for the detachable rim 11, 12 takes the form of a split expanding ring 25. This counter-support can, however, also take the form of an undivided ring which, like the split expanding ring 25, is detachably and adjustably connected to the wheel by means of inwardly projecting lugs 28 adapted to engage, in the manner of a bayonet joint, lugs 29 on the wheel 10 projecting outwards towards the periphery of the same. The additional movement towards the section 12 by which the gap 26 (Fig. 1) is entirely or partly closed, can in this case be effected by the arrangement that the closed locking ring bears against the body of the wheel by means of surfaces which are helically pitched in one direction of rotation or the other so that with its movement into the locking position it also acquires an additional movement towards the section 12. For this purpose it is merely necessary, for example, for the superposed surfaces of the lugs 28 and 29 (Figs. 1 and 2) to be constructed as portions of screw threads of very slight pitch.

We claim:

1. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring provided with a conical seat coacting with the seat of the corresponding rim section, means for varying the diameter of the said split ring, and means acting on circumferential displacement of the split ring with respect to the wheel body to permit removal of said split ring from the wheel body.

2. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring provided with a conical seat coacting with the seat of the corresponding rim section, means for varying the diameter of the said split ring, means acting on circumferential displacement of the split ring with respect to the wheel body to permit removal of said split ring from the wheel body, and coacting conical bearing faces on the contacting portions of the wheel body and split ring.

3. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring and being provided with means for varying the distance of its seat from the seat of the corresponding rim section, the said means consisting of a wedge-like member engageable between the ends of the split ring for varying the diameter thereof.

4. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring and being provided with means for varying the distance of its seat from the seat of the corresponding rim section, said means comprising a wedge-like member pivoted on the wheel body and engageable between the ends of the split ring to vary the diameter of the latter.

5. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring and being provided with means for varying the distance of its seat from the seat of the corresponding rim section, said means comprising a wedge-like member pivotally mounted on the wheel body and engageable between the ends of the split ring to vary the diameter of the latter, said wedge-like member having oppositely inclined surfaces and parallel flank portions adapted to enter between the ends of the split ring.

6. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring provided with a conical seat coacting with the seat of the corresponding rim section, means for varying the diameter of the said split ring, inwardly extending lugs carried by the split ring and abutment members carried by the wheel body and coacting with the lugs to hold the split ring on the wheel body, said ring being circumferentially movable to disengage the lugs from said abutment members and permit removal of the split ring from the wheel body.

7. A vehicle wheel assembly comprising a wheel body, a circumferentially divided rim, the rim sections having coacting conical flanges detachably connecting said sections together, means for varying the width of the connected rim sections, a fixed counter support for one rim section on the wheel body, a detachable counter support for the other rim section on the wheel body and bearing against the latter, the said detachable counter support consisting of a split ring provided with a conical seat coacting with the seat of the corresponding rim section, means for varying the diameter of the said split ring, inwardly extending lugs carried by the split ring and abutment members carried by the wheel body and coacting with the lugs to hold the split ring on the wheel body, said ring being circumferentially movable to disengage the lugs from said abutment members and permit removal of the split ring from the wheel body, the engaging surfaces of the lugs and abutment members being of substantially conical form.

EMIL ZIPPER.
WALTER ZIPPER.